UNITED STATES PATENT OFFICE.

ALBERT HENDRIK VAN DER VIJGH, HENDRIK VAN DER VIJGH, AND GERHARD VAN DER VIJGH, OF AMSTERDAM, NETHERLANDS.

ARTIFICIAL STONE.

SPECIFICATION forming part of Letters Patent No. 632,482, dated September 5, 1899.

Application filed April 11, 1899. Serial No. 712,646. (No specimens.)

*To all whom it may concern:*

Be it known that we, ALBERT HENDRIK VAN DER VIJGH, HENDRIK VAN DER VIJGH, and GERHARD VAN DER VIJGH, subjects of the Queen of Holland, residing at Amsterdam, Netherlands, have invented new and useful Improvements in the Manufacture of Artificial Stone, (for which we have applied for a patent in Great Britain, No. 23,159, dated November 3, 1898,) of which the following is a specification.

This invention relates to improvements in the composition described in the specification of our former patent, No. 597,129, dated January 11, 1898, and has for its object to improve such composition and adapt it for use as artificial stone by substituting for the coke-dust pumice-stone and slag-sand from molten iron.

According to our present invention the proportions we prefer to employ are substantially as follows, said proportions being given by measure or volume: pumice-stone, twenty parts; slag-sand, ten parts; lime, (preferably hydraulic,) eighteen parts; tan, (spent or unspent,) twelve parts; plaster-of-paris, twenty parts; water, twenty parts; total, one hundred parts.

Having now particularly described and ascertained the nature of our said invention and in what manner the same is to be performed, we declare that what we claim is—

The herein-described composition for the manufacture of artificial stone, consisting of pumice-stone, slag-sand, lime, tan, plaster-of-paris and water combined in substantially the proportions specified.

ALBERT HENDRIK VAN DER VIJGH.
  HENDRIK VAN DER VIJGH.
  GERHARD VAN DER VIJGH.

Witnesses:
 ALBERT CAREL WILLIUH, Jr.,
 JAS. MILLINE.